United States Patent
Ivanov et al.

(10) Patent No.: US 9,256,413 B2
(45) Date of Patent: Feb. 9, 2016

(54) AUTOMATIC IDENTIFICATION OF SERVICES

(75) Inventors: Radoslav Ivanov, Sofia (BG); Shenol Yousouf, Sofia (BG); Georgi Stanev, Sofia (BG)

(73) Assignee: SAP SE, Walldorf (DE)

( * ) Notice: Subject to any disclaimer, the term of this patent is extended or adjusted under 35 U.S.C. 154(b) by 344 days.

(21) Appl. No.: 13/448,668

(22) Filed: Apr. 17, 2012

(65) Prior Publication Data

US 2013/0275958 A1     Oct. 17, 2013

(51) Int. Cl.
  *G06F 9/44* (2006.01)
  *G06F 9/445* (2006.01)
(52) U.S. Cl.
  CPC ........................................ *G06F 8/61* (2013.01)
(58) Field of Classification Search
  CPC ........... G06F 11/30; G06F 17/30; G06F 8/70; G06F 8/60; G06F 8/65
  USPC .................................................. 717/168, 174
  See application file for complete search history.

(56) References Cited

U.S. PATENT DOCUMENTS

| | | | |
|---|---|---|---|
| 2009/0007067 A1* | 1/2009 | Hepper et al. | 717/115 |
| 2011/0239195 A1* | 9/2011 | Lin et al. | 717/126 |
| 2012/0081395 A1* | 4/2012 | Adi et al. | 345/634 |
| 2012/0089971 A1* | 4/2012 | Williams et al. | 717/167 |
| 2013/0227542 A1* | 8/2013 | Pei et al. | 717/170 |

OTHER PUBLICATIONS

Skar, "Towards best practices in Cloud Computing", Oct. 14, 2009, pp. 76.*
Berre, "Dependency Management for the Eclipse Ecosystem Eclipse p2, metadata and resolution", Aug. 24, 2009, p. 1-10.*
Lindberg, "Eclipse Buckminster the Definitive Guide", Sep. 4, 2009, pp. 268.*

\* cited by examiner

*Primary Examiner* — Duy Khuong Nguyen

(57) ABSTRACT

In one aspect, a metadata of an application is received. The metadata describes a number of artifacts of the computer application. Based on a reference in the application metadata, at least one service that the application is configured to access is determined. In another aspect, additional metadata describing artifacts associated with the at least one service are identified. The artifacts associated with the at least one service and the artifacts of the computer application are selected for installation of the computer application.

14 Claims, 7 Drawing Sheets

AUTOMATIC IDENTIFICATION OF SERVICES

BACKGROUND

Cloud computing is a widely adopted concept. Generally, cloud computing refers to a model for enabling ubiquitous, convenient, and on-demand access to shared pools of configurable computing resources such as networks, servers, storages, applications, functionalities, and the like. There are a number of benefits associated with cloud computing for both the providers of the computing resources and their customers. For example, customers may develop and deploy various business applications on a cloud infrastructure supplied by a cloud provider without the cost and complexity to procure and manage the hardware and software necessary to execute the applications. The customers do not need to manage or control the underlying cloud infrastructure, e.g., including network, servers, operating systems, storage, etc., but still have control over the deployed applications and possibly over the configuration settings of the application-hosting environment. On the other hand, the provider's computing resources are available to provide multiple customers with different physical and virtual resources dynamically assigned and reassigned according to clients' load.

Typically, cloud providers offer common computing resources as services to their customers. Providers may supply these services as demanded and requested by their customers to meet their specific needs and requirements. Generally, customers may choose to enrich their business applications with only some of the offered services. Usually, to do that, customers may have to manually select the desired services. This may be cumbersome and prone to errors. For example, a customer may fail to select the proper services on which functionality the business application actually depends on. This may cause the application to work improperly when deployed and installed on the cloud. Alternative scenario may be selecting and installing all available services regardless of what services the business application actually is configured to access. However, such an alternative results in higher total cost of ownership, since unnecessary computing resources are consumed and provisioned. Another negative effect may be obscuring the monitoring, controlling, and reporting of the actual usage of the computing resources, resulting in less transparency for both the provider and the consumer of the utilized services.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of techniques for automatic identification of services are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Figure 1:
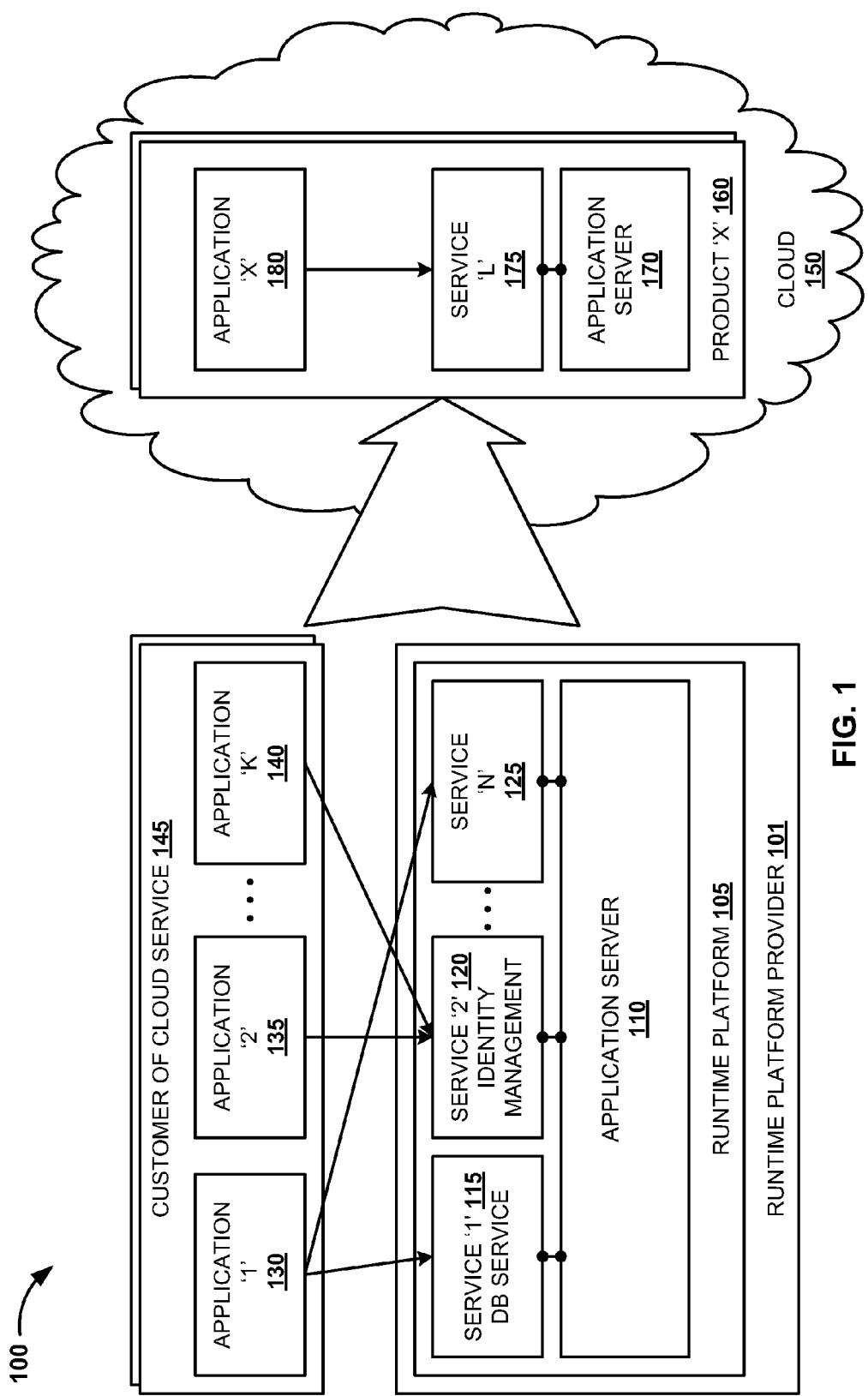
FIG. 1 illustrates an exemplary computer system landscape for deploying customer applications in cloud environment, according to one embodiment.

FIG. 1 shows an exemplary computer system landscape 100 for deploying customer applications in cloud environment, according to one embodiment. Runtime platform 105 may be developed and maintained by runtime platform provider 101. There are a number of vendors that provide commercial runtime platforms. Just as an example, SAP AG provides SAP® NetWeaver® Neo, a Java® based Platform-as-a-Service offering that makes it possible for partners and customers of SAP AG to deploy and use Java® application in a cloud environment. In one embodiment, runtime platform 105 includes application server 110 as a core part for building runtime environment based on the runtime platform 105. For example, the application server may be a Java® application server for executing Java® based applications. In another example, the application server 110 may be a webserver to provide environment for execution of web based applications.

In one embodiment, the runtime platform 105 may include a number of services 115-125 which provide additional runtime functionality that the applications 130-140 may be configured to access and consume. A service may be any type of functionality or feature that may be accessed and used by applications 130-140 and other such services. Services may be logical entities that may be distinctly used, imported, accessed or otherwise referenced. Various types of computing resources may be represented as services. One example of service may be a persistency or database service such as illustrated service '1' 115. The persistency service may provide access to a relational database for applications 130-140 to be deployed and hosted on cloud 150. The persistence service 115 may provide a default schema in which tables can be created and data stored for one or more applications from applications 130-140 that are configured to use the service. The persistence service may provide connection parameters, such as URLs, drivers, and users, and also may perform other tasks such as backup and recovery, load balancing, and scaling.

Another example of a service may be identity management such as illustrated service '2' 120. The identity management service may provide a central user store for identities that require access to protected resources of one or more applications from applications 130-140 that are configured to use the service once deployed and installed on cloud 150. The identity management service may also provide a single sign-on (SSO) access to users of applications 130-140 that are configured to use the identity management service. Other examples may include, but are not limited to, connectivity service that provides a secure and reliable access to applications, document service that provides a content repository for unstructured or semi-structured content, mail service that may enable transmission of electronic mail messages from applications that are configured to access, import, or otherwise use the service, and the like. In one aspect, the runtime platform 105 may also be supplied and offered by the runtime platform provider 101 as a service.

A customer of cloud services may develop and deliver one or more applications to be executed in cloud environment. The functionality provided by such applications may be accessed on the cloud by a number of consumers, e.g., related to the customer. As illustrated in FIG. 1, applications 130-140 are delivered by one or more customers 145, e.g., of the runtime platform provider 101. The different applications 130-140 may require, use, and depend on different runtime components for their execution. For example application '1' 130 may be configured to access services '1' 115, '2' 120 and 'N' 125, while applications '2' 135 and 'K' 140 may be configured to access just service '2' 120. In one embodiment, the applications 130-140 provided by one or more of customers 145 may be configured to access different subsets of the components of the runtime platform 105. The different subsets may have a common intersection, e.g., application server 110 and a subset of the services 115-125 required by all applications 130-140. As illustrated in FIG. 1, customers 145 may use one or more of the offered services 115-125 based on the specific requirements of the developed applications 130-140. Thus, customers 145 may reuse and utilize common functionalities and computing resources that are already offered by runtime platform provider 101. The availability of services on-demand frees customers 145 from the responsibility to provide and manage the utilized platform functionality and enables customers 145 to focus on developing the business logic of the applications 130-140.

In one embodiment, a consumer request or another event may invoke the execution of a customer application in a cloud environment. According to the characteristics of the cloud environment, the invocation of the application may cause its provisioning, installation and starting, together or after the deployment of the necessary runtime platform. FIG. 1 illustrates customer application 'X' 180 deployed on cloud 150 together with application server 170 and service 'L' 175. For example, application server 170 may include a subset of the components of application server 110 that are necessary for executing application 'X' 180 Similarly, service 'L' 175 may be one of services 115-125 that is required and used by the application 'X' 180.

Typically, application 'X' 180, service 'L' 175 and application server 170 are described or merged together in product 'X' 160, according to one embodiment. The definition of product 'X' 160 may be based on the characteristics and the requirements of the application 'X' 180. The packaging of application 'X' 180 together with the prerequisite runtime platform components, e.g., application server 170 and service 'L' 175, facilitates the installation of the application 'X' 180 on the cloud 150. In one embodiment, the required services are determined in order to package application 'X' 180 together with the prerequisite runtime platform components. According to one embodiment, identification of services used and consumed by a computer application is implemented automatically, according to one embodiment. Once identified, only the necessary services together with other prerequisite platform components and the application are installed on cloud 150. Thus, no redundant computing resources are consumed. Further, the proper services used by the application are automatically determined and installed, eliminating possible errors associated with manually selecting the needed services. For example, instead of installing all available services 115-125 only service 'L' 175 is installed together with application 'X' 180.

There are different technology solutions that implement provisioning of applications to cloud environment together with a base product, e.g., the runtime platform such as runtime platform 105. One example for such technology includes p2® provisioning platform for Eclipse®-based applications. Eclipse® is an open source community, whose projects are focused on building an open development platform composed of extensible frameworks, tools and runtimes for building, deploying and managing software across lifecycle. The p2® platform is part of the Equinox® project of Eclipse®. An Eclipse®-based product is a stand-alone program, e.g., self-contained and installable software application, built using the Eclipse® development platform. In one embodiment, Eclipse® provisioning mechanism p2® may be utilized to generate, validate and install product 'X' 160 based on the definitions of application 'X' 180 provided by customer 145, and further based on the definitions of runtime platform 105.

Figure 2:
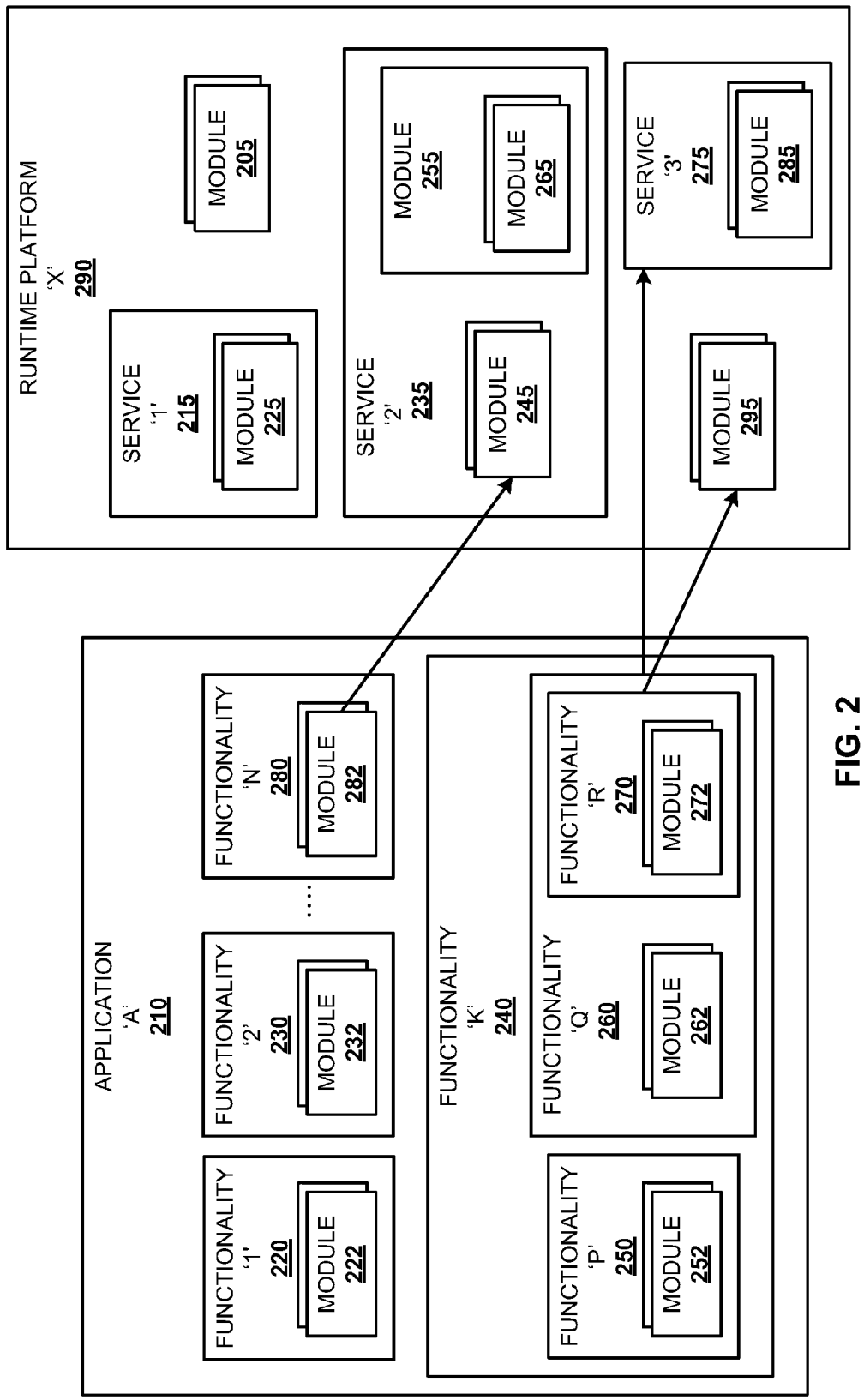
FIG. 2 illustrates application that encompasses a number of functionalities, according to one embodiment.

FIG. 2 illustrates application 'A' 210 that encompasses a number of functionalities, including functionality '1' 220, functionality '2' 230, functionality 'K' 240, functionality 'P' 250, functionality 'O' 260, functionality 'R' 270 and functionality 'N' 280. A functionality may be determined by one or more modules, such as modules 222, 232, 252, 262, 272 and 282, accordingly. A module may represent a logically, functionally, programmatically, or otherwise distinct software component providing a particular element or characteristic of the corresponding functionality. For example, if application 'A' 210 is a web application, functionality '2' 230 may provide email service, functionality 'K' 240 may provide a number of social networking capabilities, and so on.

The different functionalities and modules of an application may be related to and dependent on each other, e.g., two or more application modules may have to be executed in a specific order. Moreover, the different functionalities and modules of the application may be further configured to access, consume, and depend on one or more services offered by a runtime platform provider. In one embodiment, a graph or hierarchy may be defined among the functionalities and modules, where one functionality or module is subordinate to, dependent on, associated with, or included in another functionality or module. In one embodiment, a hierarchy may be defined among the functionalities, where one functionality is subordinate to, dependent on or included in another functionality. As FIG. 2 shows, functionality 'R' is included in functionality 'Q' 260, which in turn is subordinate to functionality 'K' 240 together with functionality 'P' 250. For example, functionality 'P' 250 could provide messaging service as part of the social network services provided by functionality 'K' 240. Further, a graph of dependencies among the functionalities may be defined, where functionalities are associated to each other without necessarily being in hierarchical relationship. For example, functionality 'P' 250 may be related to functionality 'Q' 260 as both may provide particular element of functionality 'K' 240, which as illustrated encompasses both. In one embodiment, dependencies and relationships among the different functionalities and modules may be implemented with p2®, however, other techniques may also be used.

Further, FIG. 2 shows a runtime platform 'X' 290 that encompasses a number of functionalities (not illustrated), including service '1' 215, service '2' 235, and service '3' 275. Further, other functionalities may be included in the runtime platform 'X' 290, such as based on modules 205 and 295. Services 215, 235 and 275 may be determined by and based on one or more modules 225, 245, 255, 265, and 285. Therefore, the different functionalities of runtime platform 'X' 290 may also be related to and dependent on each other. In one embodiment, a graph or hierarchy may be defined among the functionalities of the runtime platform 'X' 290, where one functionality is subordinate to, dependent on, associated with, or included in another functionality.

In one embodiment, a functionality or module of application 'A' 210 may be configured to access, use, or import a service provided by runtime platform 'X' 290. For example, functionality 'N' 280 may provide user authentication. The implementation of the user authentication may use service '2' 235 part of runtime platform 'X' 290, which may be identity management service. Therefore, as illustrated, module 282 part of the user authentication provided by functionality 'N' 280 may refer to module 245 part of the identity management service '2' 235 Similarly, functionality 'Q' 260 may refer to service '3' 275. A functionality or module of an application may be configured to access other modules or functionalities part of a runtime platform that are not included in specified services, e.g., functionality 'R' 270 may be configured to access and use module 295.

In one embodiment, a service (e.g., modules 225, 245, 255, 265, 285) may include two parts, an application programming interface (API) and an implementation of the service. The API of a service is the part of the service that can be directly imported and referenced by an application that is to be installed on a runtime platform. Thus, the implementation may be modified without affecting how the service is referenced and used. Usually, a package such as Java® package represented by a Java® Archive (JAR) file representing the API and another package representing the implementation are grouped in one feature representing the service. A feature may correspond to a particular functionality of the product or the application, and usually groups a number of unitary software components that could be managed together as a single entity. According to the terminology adopted in Eclipse® projects, such unitary software components are called plugins. The plugins are the basic installable and executable units or software code structures.

Figure 3:
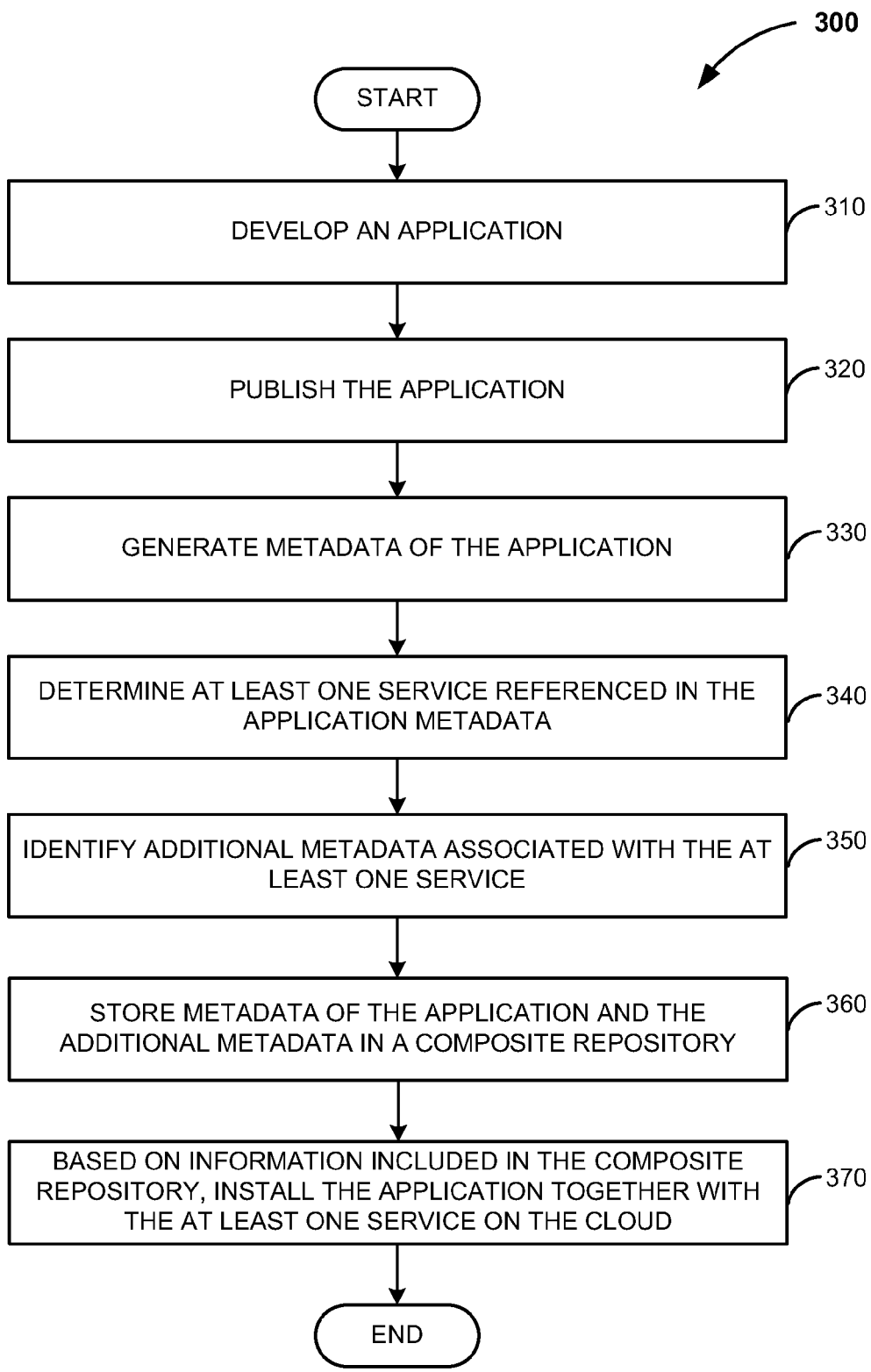
FIG. 3 illustrates a process for installing a computer application on a cloud configured to access at least one service, according to one embodiment.

FIG. 3 shows process 300 for installing a computer application on a cloud configured to access at least one service, according to one embodiment. A computer application is developed at 310. In one embodiment, a customer of a cloud runtime platform develops an application to be installed on the cloud runtime platform. The computer application may be configured to access at least one service of the cloud runtime platform. At 320 the application is published. In one embodiment, the publishing of the application refers to p2® publishing. Publishing of the application may involve compiling the application and copying files of the application to a p2® repository of the application. A URL-accessible location, such as a remote server or local file system location could be a p2® repository. At 330, during the publishing of the application, metadata of the application is generated.

In one embodiment, the metadata describes dependencies and relationships existing among the different modules and functionalities of the application. The relationships among the application modules may be defined during their development and/or their configuration. Two or more application modules may have to be executed in a specific order; the result of the execution of one module may be a condition for the execution of another; two or more unitary modules may be related in a composite module; etc.

In one embodiment, the metadata includes at least one installable unit. In the terms of the p2® provisioning platform, installable unit (IU) describes a component that can be installed, updated and uninstalled. The IUs do not contain actual artifacts, but information or metadata about such artifacts, including names, versions, identifiers, dependencies, capabilities, requirements, etc. An artifact may refer to the content or program code being installed or managed, e.g., bundles, binary archives, executable files, etc. A bundle refers to Open Services Gateway initiative (OSGi) file similar to JAR files. In one embodiment, the metadata of the application together with the installable artifacts of the application are stored in a p2® repository of the application.

Figure 4:
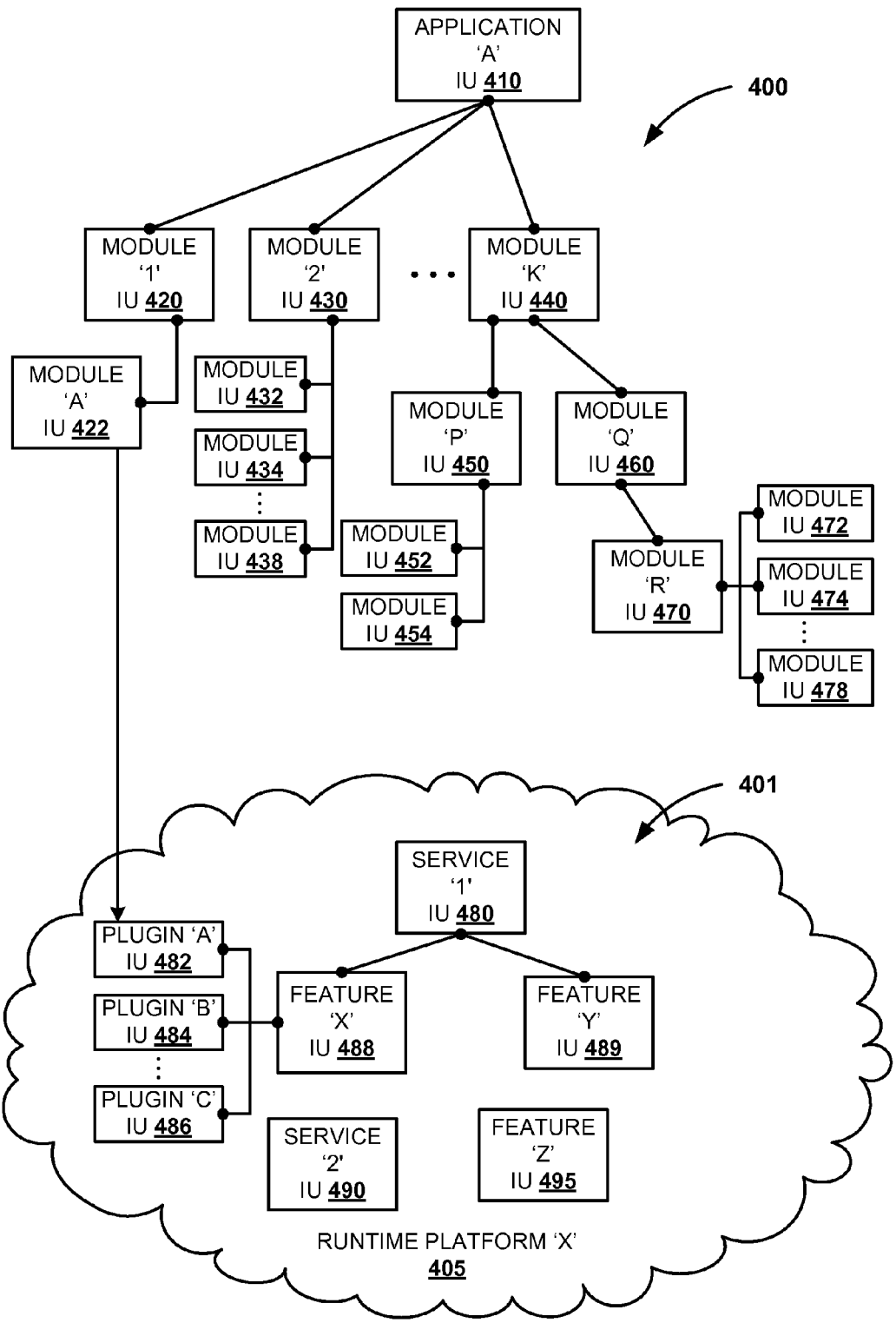
FIG. 4 illustrates a structure of installable units (IUs) corresponding to the metadata of an application and a structure of IUs corresponding to the metadata of a runtime platform, according to one embodiment.

Separate IUs may be generated for the modules and the functionalities of the application, and even for the application itself. In one embodiment, different modules and functionalities of the application may be represented as features and plugins in the context of the p2® provisioning platform. Usually, the application corresponds to a main or root IU, and the modules are the peripheral, subordinate, or leaf IUs. FIG. 4 illustrates a structure of IUs.

At 340, at least one service referenced in the application metadata is determined Often, an IU of a module includes a requirement expression containing a reference to a functionality that is a prerequisite for the proper working of the module. Thus, one package may import another package. The required or imported at least one service may be determined based on such requirement expressions included in one or more IUs of the application metadata. At 350, additional metadata associated with the at least one service is identified in the metadata of the cloud runtime platform. In one embodiment, the IU describing the determined at least one service is added to a collection, group or list with IUs describing services that are prerequisite for the installation of the application.

At 360, the metadata of the application and the identified additional metadata associated with the service are stored in a composite repository. In one embodiment, the composite repository includes metadata of the application, installable artifacts of the application, and metadata of the service part of the runtime platform that are prerequisite for the installation of the application. At 370, based on the information included in the composite repository, the application is installed on the cloud runtime platform together with the at least one service. In one embodiment, at least one virtual machine is instantiated in a cloud runtime platform. The application and the at least one service are installed on the virtual machine FIG. 4 shows a structure of IUs 400 corresponding to the metadata of an application, according to one embodiment. Application 'A' IU 410 is the root IU of the metadata of application 'A'. For example, application 'A' IU 410 may correspond to application 'A' 210 in FIG. 2. Accordingly, the IUs 420-478 in FIG. 4 may correspond to the different components (functionalities and modules) 220-282 of application 'A' 210 in FIG. 2. In one embodiment, modules 420-478 may be represented as features or plugins.

The application 'A' root IU 410 refers to module '1' IU 420, module '2' IU 430 and module 'K' IU 440. More specifically, application 'A' provides capabilities provided by the modules corresponding to the IUs 420-478. Further, module '1' IU 420 refers to module IU 422; module '2' IU 430 refers to module IU 432-438; module 'K' IU 440 refers to module 'P' IU 450 and to module 'Q' IU 460. Further, module 'P' IU 450 refers to module IUs 452-454 and module 'Q' IU 460 refers to module 'R' IU 470. These references specify dependencies or relationships among the functionalities corresponding to the modules of application 'A' as described in metadata. The relationships among the modules or functionalities of an application may form a graph structure different from a tree, where the IU corresponding to the application may still be on the highest hierarchical level.

Further, FIG. 4 shows a structure of IUs 401 corresponding to the metadata of runtime platform 'X' 405. Similar to the metadata of the application in the structure of IUs 400, the metadata of runtime platform 'X' 405 describes dependencies or relationships among the functionalities of the runtime platform 'X' 405. For example, service '1' IU 480 refers to feature 'X' IU 488 and feature 'Y' IU 489. More specifically, as described in IU 480, service '1' provides or exports the functionality of feature 'X' and feature 'Y'. Further, feature 'X' provides functionalities of modules described by IUs 482-486 of plugin 'A', plugin 'B', and plugin 'C', respectively. On the other hand, service '1' may not be related to service '2' and feature 'Z' as illustrated by IU 490 and IU 495, respectively.

As illustrated in FIG. 4, module 'A' may be configured to access or import plugin 'A' represented by IU 482 part of the metadata of runtime platform 'X' 405. Functionality of plugin 'A' is provided by feature 'X', which in turn is provided by service '1'. Thus, IU 422 of module 'A' indirectly refers to service '1' by referencing metadata of a functionality that this service provides. The services referenced directly or indirectly by the application metadata, are identified and selected for installation together with the application artifacts.

Figure 5:
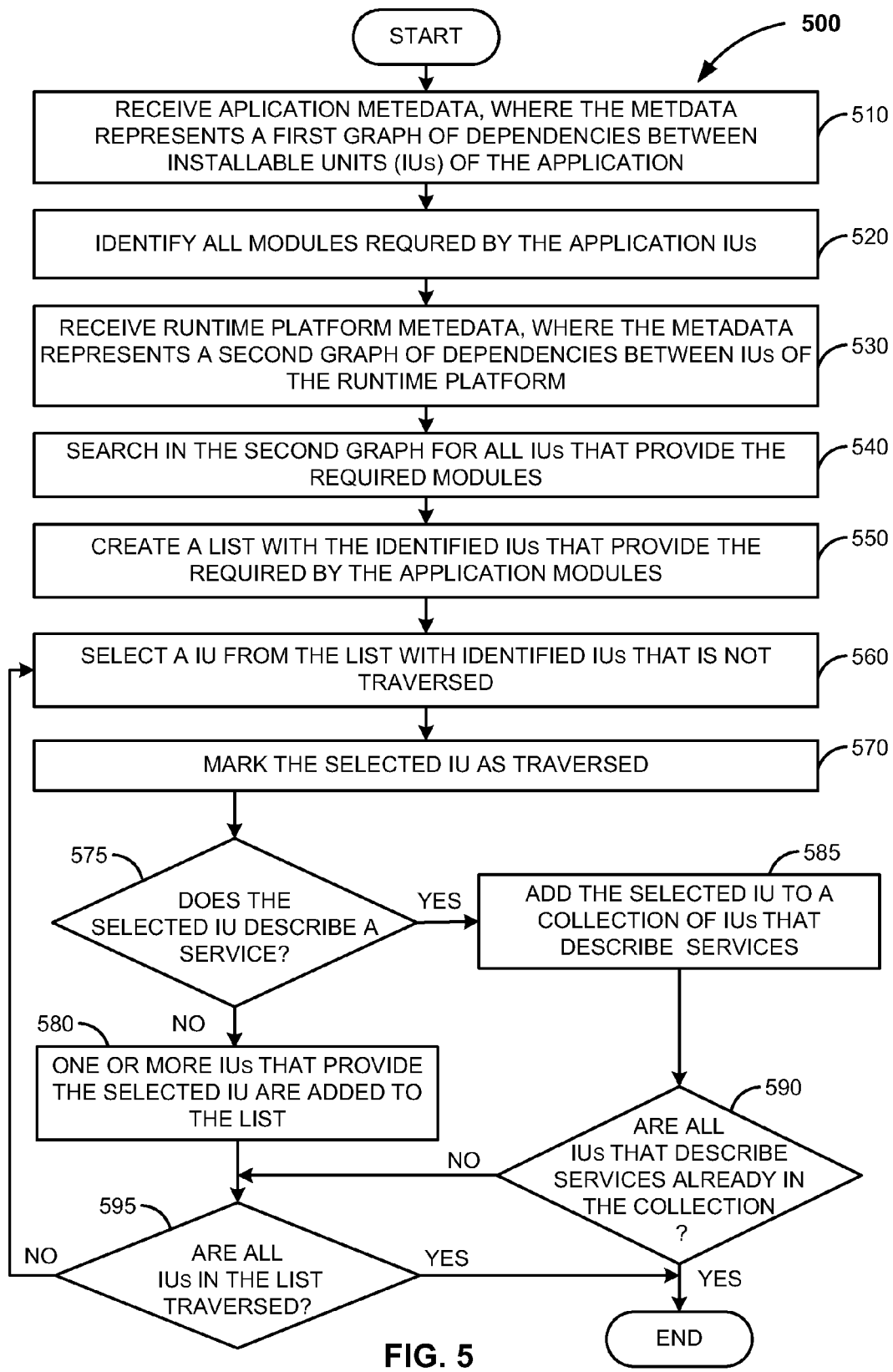
FIG. 5 illustrates a process for automatic identification of at least one service to be accessed by an application, according to one embodiment.

FIG. 5 illustrates a process 500 for automatic identification of at least one service to be accessed by an application, according to one embodiment. At 510, metadata of an application is received. The metadata represents a first graph of dependencies or relationships among IUs of the application, e.g., structure 400 of IUs in FIG. 4. The application is to be installed on a runtime platform such as runtime platform 105 in FIG. 1.

An IU describes, among other things, capabilities and requirements associated with the IU. Capabilities associated with an IU refer to functionality that the application module corresponding to the IU, provides. These capabilities may satisfy requirements of other IUs. On the other hand, the requirements associated with the IU refer to functionality that the corresponding module necessitates as a prerequisite in order to be installed or to work properly once installed. Dependencies among different modules of an application may be resolved based on capabilities and requirements of IUs. At 520, the modules including services required, imported or otherwise referenced by the application, but not included in the application, are identified based on the requirements specified in the IUs of the application.

At 530, metadata of the runtime platform is received. In one embodiment, the runtime platform may be a cloud runtime platform. The metadata of the runtime platform represents a second graph of dependencies or relationships among IUs, e.g., structure 401 of IUs in FIG. 4. At 540, the IUs that provide the functionality of the required modules are searched for in the second graph of dependencies based on the capabilities specified in the IUs of the runtime platform. In one embodiment, a graph of dependencies among IUs may be searched using a p2® querying language.

At 550, a list is created including the identified IUs of the runtime platform that provide the modules required by the application. In one embodiment, a stack or other data structure may be used to store the list of identified IUs.

At 560, an IU from the list with identified IUs that is not traversed is selected. At 570, the selected IU is marked as traversed. In one embodiment, by marking selected IUs as traversed, repetition of traversing the same IUs is avoided. At 575, a check is performed if the selected IU describes a service. In one embodiment, an IU may include type information for the corresponding module that the IU describes, e.g., if the module is of type "service". An example of such type information may be represented as follows:

<property name="com.sap.jpaas.type"
    value="service"/>

At 585, if the selected IU describes a service, the selected IU is added to a collection of IUs of the runtime platform that describe services. The collection groups identified IUs of services to be installed together with the application. At 590, a check is performed if all IUs that describe services are already identified and added to the collection. If all IUs in the metadata of the runtime platform that describe services are already identified, process 500 stops without further searching for services referenced by the application.

At 580, if the selected IU describes a module that is not a service, one or more IUs that provide the selected IU are added to the list with the identified IUs of the runtime platform that provide the required by the application modules. Thus, the one or more IUs that directly provide, export or otherwise reference the selected IU are added to the list to be checked whether describe services. At 595, a check is performed whether all the IUs in the list are traversed. If there are IUs in the list that are not traversed process 500 continues at 560. If all IUs in the list are traversed process 500 ends.

Figure 6:
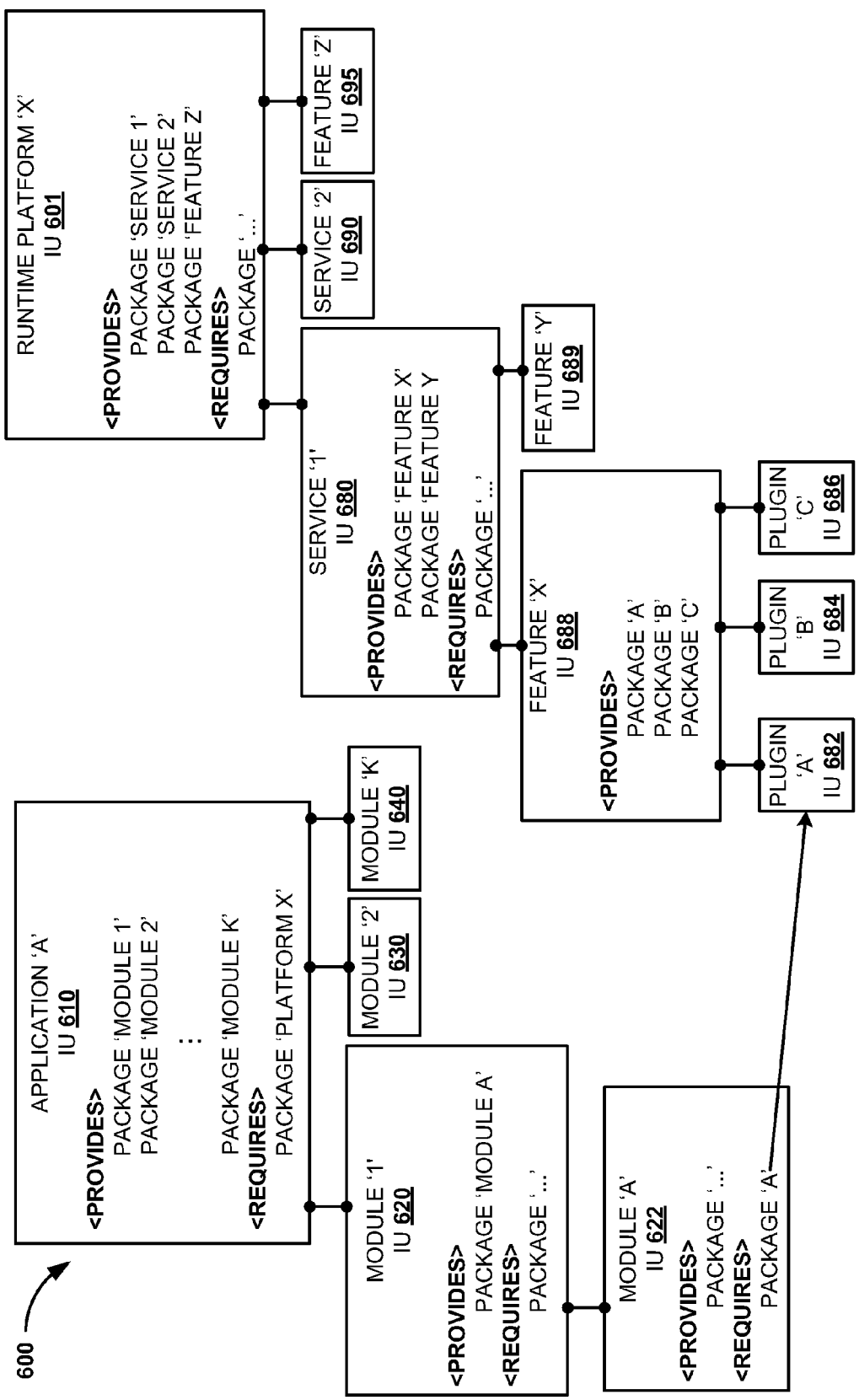
FIG. 6 illustrates content and structure of IUs of an application that is configured to access at least one service, according to one embodiment.

FIG. 6 illustrates content and structure 600 of IUs of an application that is configured to access at least one service, according to one embodiment. Application 'A' IU 610 is the root IU of the metadata of application 'A'. In one embodiment, illustrated IUs in FIG. 6 provide further detail to the content of some of the IUs described in relation to FIG. 4. For example, application 'A' IU 610 may correspond to application 'A' IU 410 in FIG. 4. Similarly, IUs 620, 630, 640, 622 correspond to IUs 420, 430, 440, 422. Further, IUs 680, 690, 695, 688, 689, 682, 684, and 686 correspond to IUs 480, 490, 495, 488, 489, 482, 484, and 486. Also, runtime platform 'X' IU 601 may correspond to structure 401 of IUs of the runtime platform 'X' metadata illustrated in FIG. 4.

According to methods and techniques described herein, based on the metadata of application 'A', all modules required by IUs 610-640 of the application are identified. Once the requirements of the application are identified, modules that provide the required by the application functionality are searched for in the metadata of the runtime platform 'X'. In other words, the capabilities of IUs 601 and 680-695 describing components of the runtime platform 'X' are traversed. As a result, it is identified that package 'A' described by IU 622 is provided by plugin 'A' described by IU 682.

In one embodiment, an application may access a service via an API of the service such as Java® API or Representational state transfer (REST) API. Thus, typically, the application is configured to access only the API of a service, without having access to the full implementation of the service. However, the implementation part of the service is also required for the application to work properly when deployed and installed on the cloud. In one embodiment, the feature representing the service is identified to be included in the installation of the application.

According to process 500, a check is performed if plugin 'A' is a service. As illustrated in FIG. 6, plugin 'A' is not a service. The process continues by searching if the module that provides plugin 'A' is a service, i.e., feature 'X' described by IU 688. As illustrated in FIG. 6, feature 'X' is not a service. Similarly, the process continues by searching if the module that provides feature 'X' is a service. As illustrated, the module that provides feature 'X' is service '1' described by IU 680. Thus, service '1' is identified as a service that the application is configured to access. In one embodiment, service '1', including the modules such as features and plugins of the service '1', are installed together with the application.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 7:
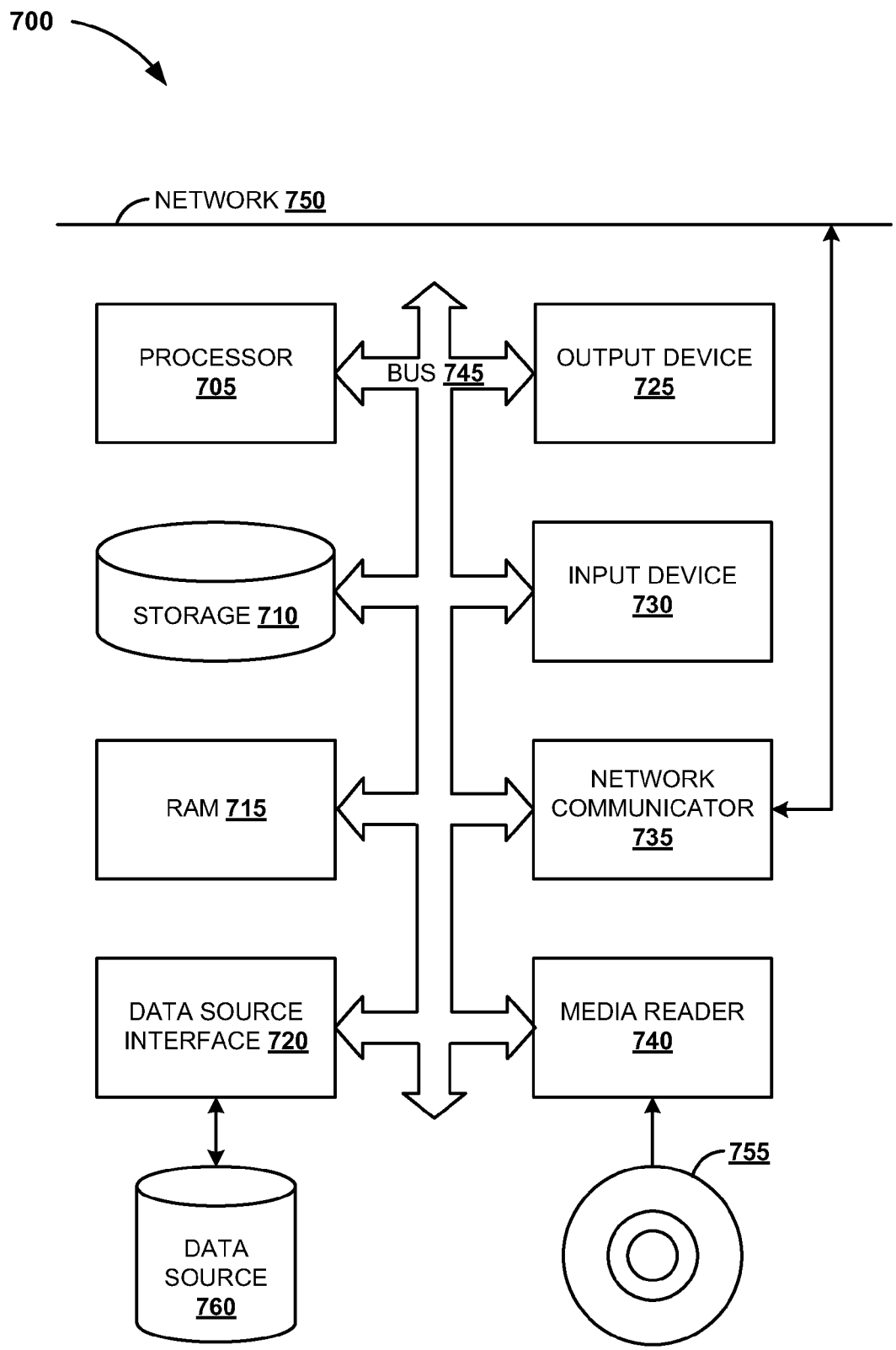
FIG. 7 is a block diagram of an exemplary computer system to execute computer readable instructions for automatic identification of services, according to one embodiment.

FIG. 7 is a block diagram of an exemplary computer system 700. The computer system 700 includes a processor 705 that executes software instructions or code stored on a computer readable storage medium 755 to perform the above-illustrated methods of the invention. The computer system 700 includes a media reader 740 to read the instructions from the computer readable storage medium 755 and store the instructions in storage 710 or in random access memory (RAM) 715. The storage 710 provides a large space for keeping static data where at least some instructions could be stored for later execution. The stored instructions may be further compiled to generate other representations of the instructions and dynamically stored in the RAM 715. The processor 705 reads instructions from the RAM 715 and performs actions as instructed. According to one embodiment of the invention, the computer system 700 further includes an output device 725 (e.g., a display) to provide at least some of the results of the execution as output including, but not limited to, visual information to users and an input device 730 to provide a user or another device with means for entering data and/or otherwise interact with the computer system 700. Each of these output devices 725 and input devices 730 could be joined by one or more additional peripherals to further expand the capabilities of the computer system 700. A network communicator 735 may be provided to connect the computer system 700 to a network 750 and in turn to other devices connected to the network 750 including other clients, servers, data stores, and interfaces, for instance. The modules of the computer system 700 are interconnected via a bus 745. Computer system 700 includes a data source interface 720 to access data source 760. The data source 760 can be accessed via one or more abstraction layers implemented in hardware or software. For example, the data source 760 may be accessed by network 750. In some embodiments the data source 760 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. A computer implemented method to automatically identify services consumed by a computer application, the method comprising:
   receiving a first plurality of application installable units describing a first plurality of application artifacts of the computer application;
   determining at least one service required by the computer application from a plurality of services provided by a cloud platform, wherein the at least one service is determined by searching in a first graph of dependencies among the first plurality of application installable units;
   determining a second plurality of service artifacts providing functionality of the at least one service by searching a second graph of dependencies among a second plurality of cloud platform installable units, wherein a subset from the second plurality of cloud platform installable units corresponds to the second plurality of service artifacts;
   upon determining the second plurality of service artifacts and prior installation of the computer application, selecting the second plurality of service artifacts and the first plurality of application artifacts for installation of the computer application, wherein the second plurality of service artifacts and the first plurality of application artifacts are minimum required artifacts for the installation of the computer application;
   storing the first plurality of application installable units and the subset from the second plurality of cloud platform installable units with the first plurality of application artifacts in a composite repository, and
   based on the information included in the composite repository, installing the first plurality of application artifacts together with the second plurality of service artifacts;
   wherein installing the first plurality of application artifacts of the computer application together with the second plurality of service artifacts comprises:
      instantiating at least one virtual machine in a cloud system environment to provide an independent runtime platform for the computer application, and
      installing the computer application on the at least one virtual machine including the at least one service.

2. The method of claim 1, wherein determining the at least one service comprises:
   identifying at least one installable unit of the first plurality of application installable units that imports at least one module associated with the at least one service.

3. The method of claim 2 further comprising:
   identifying an installable unit from the second plurality of cloud platform installable units that corresponds to the at least one module.

4. The method of claim 3, wherein identifying the installable unit from the second plurality of cloud platform installable units further comprises:
   searching the second plurality of cloud platform installable units for direct or indirect export of the at least one module.

5. The method of claim 1 further comprising:
   based on the subset from the second plurality of cloud platform installable units, storing the second plurality of service artifacts together with the first plurality of application artifacts in a composite repository.

6. A computer system to automatically identify services consumed by a computer application, the system including:
   at least one processor and memory for executing program code, which when executed cause the computer to perform operations comprising:
      receiving a first plurality of application installable units describing a first plurality of application artifacts of the computer application;
      determining at least one service required by the computer application from a plurality of services provided by a cloud, wherein the at least one service is determined by searching in a first graph of dependencies among the first plurality of application installable units;
      determining a second plurality of service artifacts providing functionality of the at least one service by searching a second graph of dependencies among a second plurality of cloud platform installable units, wherein a subset from the second plurality of cloud platform installable units corresponds to the second plurality of service artifacts; and
      upon determining the second plurality of service artifacts and prior installation of the computer application, selecting the second plurality of service artifacts and the first plurality of application artifacts for installation of the computer application, wherein the second plurality of service artifacts and the first plurality of application artifacts are minimum required artifacts for the installation of the computer application.

7. A computer system to automatically identify services consumed by a computer application, the system including:
   at least one processor and memory for executing program code, which when executed cause the computer to perform operations comprising:
      receiving a first plurality of application installable units describing a first plurality of application artifacts of the computer application;
      determining at least one service required by the computer application from a plurality of services provided by a cloud, wherein the at least one service is determined by searching in a first graph of dependencies among the first plurality of application installable units;
      determining a second plurality of service artifacts providing functionality of the at least one service by searching a second graph of dependencies among a second plurality of cloud platform installable units, wherein a subset from the second plurality of cloud platform installable units corresponds to the second plurality of service artifacts;
      upon determining the second plurality of service artifacts and prior installation of the computer application, selecting the second plurality of service artifacts and the first plurality of application artifacts for installation of the computer application, wherein the second plurality of service artifacts and the first plurality of application artifacts are minimum required artifacts for the installation of the computer application;

storing the first plurality of application installable units and the subset from the second plurality of cloud platform installable units with the first plurality of application artifacts in a composite repository, and based on the information included in the composite repository, installing the first plurality of application artifacts of the computer application together with the second plurality of service artifacts;

wherein installing the first plurality of artifacts of the computer application together with the second plurality of artifacts comprises:

instantiating at least one virtual machine in a cloud system environment to provide independent runtime platform for the computer application, and installing the computer application on the at least one virtual machine including the at least one service.

8. The system of claim 7 further comprising:
identifying an installable unit from the second plurality of cloud platform installable units that corresponds to the at least one module.

9. The system of claim 8, wherein identifying installable unit from the second plurality of cloud platform installable units further comprises:

searching the second plurality of cloud platform installable units for direct or indirect export of the at least one module.

10. A non-transitory computer readable medium storing instructions thereon, which when executed by a processor cause a computer system to:

receive a first plurality of application installable units describing a first plurality of application artifacts of the computer application;

determine at least one service required by the computer application from a plurality of services provided by a cloud platform, wherein the at least one service is determined by searching in a first graph of dependencies among the first plurality of application installable units;

determine a second plurality of service artifacts providing functionality of the at least one service by searching a second graph of dependencies among a second plurality of cloud platform installable units, wherein a subset from the second plurality of cloud platform installable units corresponds to the second plurality of service artifacts;

upon determining the second plurality of service artifacts and prior installation of the computer application, selecting the second plurality of service artifacts and the first plurality of application artifacts for installation of the computer application, wherein the second plurality of service artifacts and the first plurality of application artifacts are minimum required artifacts for the installation of the computer application;

storing the first plurality of application installable units and the subset from the second plurality of cloud platform installable units with the first plurality of application artifacts in a composite repository, and based on the information included in the composite repository, installing the first plurality of application artifacts of the computer application together with the second plurality of service artifacts;

wherein installing the first plurality of artifacts of the computer application together with the second plurality of artifacts comprises:

instantiating at least one virtual machine in a cloud system environment to provide independent runtime platform for the computer application, and installing the computer application on the at least one virtual machine including the at least one service.

11. The computer-readable medium of claim 10, wherein determining the at least one service comprises:

identifying at least one installable unit of the first plurality of application installable units that imports at least one module associated with the at least one service.

12. The computer-readable medium of claim 11, wherein the instructions to further cause the computer to:

identifying an installable unit from the second plurality of cloud platform installable units that corresponds to the the at least one module.

13. The computer-readable medium of claim 12, wherein identifying the IU of the second plurality of IUs corresponding to the at least one service further comprises:

searching the second plurality of cloud platform installable units for direct or indirect export of the at least one module.

14. The computer-readable medium of claim 10, wherein the instructions to further cause the computer to:

based on the subset from the second plurality of cloud platform installable units, storing the second plurality of service artifacts together with the first plurality of application artifacts in a composite repository.

* * * * *